United States Patent [19]
Luc

[11] 3,949,896
[45] Apr. 13, 1976

[54] SEAMED ARTICLE

[76] Inventor: Penelope Jane Vesey Luc, 18, rue Fourcroy, Paris 17, France

[22] Filed: July 9, 1974

[21] Appl. No.: 486,844

Related U.S. Application Data

[63] Continuation of Ser. No. 190,700, Oct. 20, 1971, abandoned, which is a continuation-in-part of Ser. No. 830,831, June 5, 1969, abandoned.

[30] Foreign Application Priority Data

Oct. 23, 1970  France .............................. 70.50494
Dec. 14, 1970  France .............................. 70.59366

[52] U.S. Cl. .................................. 220/75; 228/112
[51] Int. Cl.² .......................................... B65D 7/42
[58] Field of Search ...... 220/75, DIG. 29; 29/470.3, 29/478

[56] References Cited
UNITED STATES PATENTS

| | | | |
|---|---|---|---|
| 1,601,927 | 10/1926 | Toby | 220/DIG. 29 |
| 2,013,517 | 9/1935 | Kachel | 219/66 |
| 2,092,093 | 9/1937 | Silverman | 220/DIG. 29 |
| 2,205,251 | 6/1940 | Gillette | 220/DIG. 29 |
| 3,358,113 | 12/1967 | Delczynski | 219/66 |
| 3,435,510 | 4/1969 | Oberle | 29/470.3 |
| 3,591,756 | 7/1971 | Timko | 219/66 |
| 3,618,817 | 11/1971 | Troughton | 220/75 |

*Primary Examiner*—William I. Price
*Assistant Examiner*—Steven M. Pollard
*Attorney, Agent, or Firm*—Kenyon & Kenyon Reilly Carr & Chapin

[57] ABSTRACT

Metal cans are welded by frictional treatment of the materials joined. The treatment is provided by a rapidly rotating smooth hard friction tool e.g. wheel contacting a surface of the metal above the join while the parts joined are held in pressure contact by independent pressure exerting means and/or by the wheel itself. In the formation of can side-seams the wheel and the can are relatively traversed and a longitudinal continuous side-seam is formed which in the case of the metal to metal joints is metallurgically homogeneous and may be characterized in that no signs of melting of the base metal are visible at the welded interfaces.

8 Claims, 11 Drawing Figures

SEAMED ARTICLE

This is a continuation of Ser. No. 190,700, filed Oct. 20, 1971, now abandoned, which is a continuation-in-part of Ser. No. 830,831, filed June 5, 1969, now abandoned.

The present invention relates to processes for the formation of adhesive or cohesive bonds between metal parts, in the formation of metal cans, drums or containers. In this Specification a reference to cans should be taken to include drums and containers. An adhesive bond is one in which an interface between the parts bonded is still present; a cohesive bond is one in which the interface has disappeared at least on the visible scale so that in effect the parts bonded have become integral with each other.

The invention achieves this bonding by a frictional process. In this, one or both of the metal parts is frictionally treated by a frictional tool as, or just before, the bond forms between the parts. The bond will usually be in the form of a seam-line. Metallurgically homogeneous continuous cohering dry joints are possible.

A dry joint is one in which no cementing material such as solder or plastics is used between the parts being bonded. A metallurgically homogeneous continuous joint is one in which the metallurgical characteristics of the joint do not vary in a substantial manner along the joint line.

The mechanism of bonding in this process is not at present known. It certainly involves the supply of energy from a tool used to effect the treatment e.g. on an outer surface of the assembly of materials to be bonded, to their interfaces, but it is entirely distinct from such processes as friction-welding (where both parts are partly fused by being rubbed against each other until melted and then are upset by being pressed together under high pressures), forge welding (where two parts are directly adhered or cohered together by the combined effect of heat and pressure on them) or bonding by thermal means (where essentially a ribbon of hot melt adhesive is deposited on an edge of an overlap portion of a seam and while it is still hot, or after it has been reheated, the other edge is applied to it under pressure which is maintained during a cooling cycle). In the present process, although a certain amount of heat is generated between the tool and the part it is treating, this need be nowhere near enough to melt the material on a macroscopic scale; although some pressure is applied, it need only be sufficient to keep the parts to be bonded in intimate contact and can be of an entirely different order from the pressures needed in friction-welding or forge-welding; and even in the case where a metallic or non-metallic coating or interposed layer is between the metal parts in the same, this need not reduce to a liquid state in the process. Such a coating or layer is itself affected by the frictional treatment, by the same unknown mechanism.

The principal application of the present process is in the manufacture of the side-seams of a "lap seam" type of can, i,e. one in which opposite edges of a sheet are brought over one another to overlap face-to-face, and secured in that position without over-folding or beading, but it can also be applied to the formation of other bonds in or to cans (e.g. a seam between a top or bottom closure and the wall of the can or a hinge, or a spot for the attachment of an opening device) or of other types of side-seams (e.g. butt joints, layup seals, stepped seals, rollover seals and applique seals). Thus it is apparent that the process may be applied to bond together two parts of the same integer (e.g. in forming a tube from a sheet or web) or bonding together two (or more) distinct integers; and the materials of the parts bonded may be the same as each other or different.

I have in mind particularly the use as the metal of tin-plate (tin-plated steel) or tin free steel.

The normal method of joining tin-plate to form cans is by mechanically interlocking the edges and turning them over to form a double seam. To render this type of seam fluid-tight, liquid solder is introduced into the seam and set under pressure to form the joint. According to the present process neither double seaming or solder are required to form a joint and even with a narrow seam of 1.50 mm width seal strength can exceed 200 lbs. (100 kg.) inch, resulting in a very great economy, not only of the materials comprised in a can, but in the actual can making operation itself.

Tin free steel (TFS) is increasingly being used in industry particularly for carbonated beverages and other soft drinks because as starting material it has a lower cost than tin-plate. However, it has presented such difficulties in weld-formation that the initial economic advantage has not been found in the finished can. This material is also capable of being bonded according to the process and the prior removal of the normal chrome chrome-oxide coating is not necessary. These steels are usually coated with an organic coating on one side for corrosion protection and a size on the other for reception of printing inks; to bond the two sides of a plate into a tube at a lap seam, either a highly specific thermoplastic cement is used which has to be compatible with and strongly adhesive to both coatings (see R. F. Ellis "Modern Packaging" March, 1970, 77-80) or a forge welding process is used which involves the preparation of the lapping edges by removal of the chrome chrome-oxide or other coating and the electrical heating of the metal in the seam area to high temperatures and the application of pressures so high as to reduce the thickness of the overlap from twice to 1.7 times the thickness of each edge (W. T. Chiappe, op.cit, 82–84).

In carrying out processes of the present invention no liquid adhesive need be used nor is there any need specially to prepare the parts which are to be bonded - even if aluminum is the material the oxide layer will not usually need to be removed. Moreover even if a non-metallic coating is present on one metal part there is no need to prime or otherwise prepare the other metal part for its reception.

Investigation of the metal to metal bonds formed by the process at the interfaces of the overlapping edges of tin plated steel appear to show that it is possible by modifying process parameters, for example pressure, to achieve a joint formed by cohesion of the tin to tin coatings, or a joint in which the tin coating is pushed to the outer edges of the seam area resulting in a hermetic seam while the centre of the bond is caused by a cohesive steel to steel weld. Moreover, it has been found possible to form the joint on the very edge of the outer overlapping can edge in such a way that it becomes flat and almost flush with the can body improving the can appearance and reducing the risk of the can edge catching onto anything.

Although the physical mechanisms involved in the metal to metal bonds obtained by the present process are not yet entirely understood it is possible that molecular diffusion occurs at the contacting interfaces. In some steel to steel joints which have been examined microscopically, recrystallization of the metal and grain growth across the interfaces has occurred to form a cohesive joint, the flattened grain structure of cold rolled steel being converted to an equi-axial structure, and these welds have tensile strengths in excess of the metal sheet itself. No melting of the metal is apparent.

The present process permits the formation of narrow seam lines (and indeed preferably is carried out as to produce them) of sufficient strength to allow the material used in the seam area, or in the overlap area to be reduced to as little as one or two millimeters, thus saving approximately 2 to 20 mm$^2$ or more of metal plate in an average size can. At the same time this leaves a maximum area available for overprinting or other decoration.

Although the process can be employed to obtain metal to metal joints it is also possible to fabricate cans employing a material which will act as an adhesive or cement in the seam area.

Among the non-metallic materials suitable for use as a bonding agent or cement in association with the present process are many thermoplastic and some thermosetting plastics materials. These may be utilized in the seam area either as a strip applied in liquid form to one lap edge and then allowed to dry prior to the welding operation, or as a strip of film inserted between the lapping edges prior to the bonding operation, or as particulate material. Metal solders can also be used.

The metals may be coated by other metals — the commonest such product being tin-plated steel — including steel coated with metallic chromium covered by a thin layer of chromium oxide (TFS-CT), or with chromate phosphate (CPT-210), rhodium and other metal substances.

The bonding effect of the frictional treatment may be aided by auxiliary excitation of the area where the bond is formed, by application of a series of compressive or decompressive impulses or of vibrational energy in the sonic and ultrasonic range or by application of electrical or thermal energy. In all cases however, under the conditions of application of the process, either the amount of auxiliary excitstion applied is not in itself enough to cause formation of the bond and unless the frictional treatment were to be applied, no bond would be formed, or in cases where the auxiliary means of excistion are alone capable of creating bonds, the bonds formed when these means are used in conjunction with the frictional process are superior to those which would be formed if auxiliary means of excitation alone were used. For example, the bonds are of higher quality, or they are formed at a faster rate or more efficiently.

The use of auxiliary excitation also permits the energy used and applied by the frictional tool to be less than would otherwise have been needed to effect a bond in any particular situation, or inversely it permits reduction of the amount of energy provided by a more costly source of auxiliary excitation than would be required if such means were employed singly.

When vibrational energy is applied by means of ultrasonic energy supplied to a tool (in known manner) it is preferred that the frictional tool replaces the anvil on the opposite side from the ultrasonic tool of the overlapping parts being sealed. The ultrasonic tool may be placed perpendicularly or at a tangent or horizontally to the surface of the seam. The efficiency of the ultrasonic process is greatly improved in this manner, and for example, pressures normally required when operating the ultrasonic process alone can be reduced and also resistance to the movement of the work past the welding tool. In consequence wear on the expensive ultrasonic tool will decrease considerably, while welding speeds will be greatly increased.

The band of vibrational energy which can be associated with the frictional process is much wider than that normally employed in ultrasonic equipment and systems employing both sonic and high to very high frequencies can be used.

The frictional process can be advantageously combined with dielectric heating or sealing processes, including impulse sealing, radio frequency impulse induction suscetor, high frequency, and radio frequency thermal (plated) methods.

In applications to continuous can-welding the friction wheel can serve as an earthed electrode while a wheel on the opposite side of the work can be connected to a high frequency generator, for example one operating in the 15 to 60 megacycle range at 100 watts to 10 kilowatts, and this will again permit bonds to be formed under comparatively low loads and at high speeds. An electrical arc or corona formed between a source of high frequency on one side of the work and the frictional tool on the other side also assists bond formation.

To supply heat as auxiliary excitation either a heated backing, e.g. a wheel, may be used on one side of the work while the frictional tool is applied to the other side, or the frictional tool can itself be heated in cases where it is useful either to reduce load or the relative speed of the friction tool. In both cases the temperature of the heated tools is preferably high and thermostatically controlled.

Although heat can be combined with the present process it is in fact often useful actually to cool the friction wheel itself or the backing to the assembly being welded to prevent overheating.

The tool usually to be used will be a rotating wheel of a smooth, hard material, particularly a wheel made of metal such as Carbon steel, Chrome Nickel and Molybdenum alloy steels, or Tungsten Carbide alloys. These metal wheels can be especially treated, coated or hardened. Wheels can also be made of "Vespel" (Dupont regd. Trade Mark) filled with either molybdenum disulphide, carbon or graphite, or of "Tufnol" (a laminated synthetic resin product reinforced with paper, fabric or asbestos): "Tufnol" is a Registered Trade Mark of Tufnol Ltd.).

These wheels will preferably be from 4 to 8 cms in diameter and be run at a speed of about 3000 to about 45,000 rpm, or in the case of high frequency driven rotary tools to 100,000 rpm or more. A suitable motor to drive the wheel in rotation is a ½ h.p. electric motor taking 600 watts and capable of speeds up to about 45,000 rpm controlled through a variable transformer.

The work may be moved past the tool or the tool past the work.

Pressure applied (either directly and wholly by the tool or partly by the tool and partly by additional pressure-exerting means) will vary widely according to the thickness and other characteristics of the material(s) being bonded. A maximum used in spot welding will be perhaps 160 kg/cm$^2$ which although a high pressure is not of the order of the pressures used in friction or forge-welding. In seam welding the pressure exerted by the wheel on the seam can be very low, e.g. 2 to 10 lbs (1 to 4.5 kg).

During can forming, seaming or capping operations and immediately afterwards, it is preferable to assist and to maintain good contact of the interfaces of the metal parts being or having been joined, by contact means which are independent of the actual friction source. This will avoid application of high pressure on the work through the friction source such as a friction wheel and will greatly reduce the energy requirements of the process as well as wear on the friction tool. It will also reduce to a minimum any mark made by the tool on the metal surface with which it is in contact.

The thinness or thickness of the metal sheet used to form can bodies, caps, lids, tops, bottoms, or other parts, which it is possible to weld with the process, do not appear to have any practical limitations and for example, four tin plated steel blanks (each 240 microns thick) have been superimposed and welded together in a single operation. Moreover, if required, it is possible to place a frictional source on either side of the seam to be welded. These may be juxtaposed, or may operate on opposite sides of the seam in a slightly spaced relationship.

Can seam welding speeds can be very high, and the linear speed at which a continuously or discontinuously formed tube can be welded, can exceed 1 meter/second. If a can cap or bottom is to be welded to the can body end before filling, or a cap after filling, this can be done in several ways. One method is to fit the can bottom in place and to turn its rim against a friction tool which will weld the edge of the can body to the can bottom where they contact. Another method is to fit the can bottom in place and to apply to it an annular or drum shaped friction tool head which is rotating rapidly about an axis perpendicular to the plane of the line of sealing of the can bottom to the can body and has an annular surface parallel to the said line of sealing which comes into contact with the rim of the can bottom where it is to be sealed to the body, the tool being applied to the can bottom intermittently. Welding speeds of 1/25th sec. or less are possible in this type of operation. The same methods can be used to fix opening devices to the can top or body.

In general, the greater the thickness of the material intervening between the tool and the surfaces joined, the more energy must be supplied by the tool, either by greater pressure of the tool or by higher speed.

Examples of seams produced according to the invention and apparatus for carrying out processes within the invention are shown in the accompanying drawings wherein:

FIGS. 1 to 3 are magnifications respectively of X50, X190 and X1,000 of two sheets of tin free steel (both chrome-chrome oxide coated) each 150 – 180 $\mu$ thick. In the actual joint (i.e. the central part of FIG. 1 and the whole of the joint lines indicated in FIGS. 2 and 3) a dry weld has formed of high tensile strength, without any apparent melting of the metal.

Figure 4:
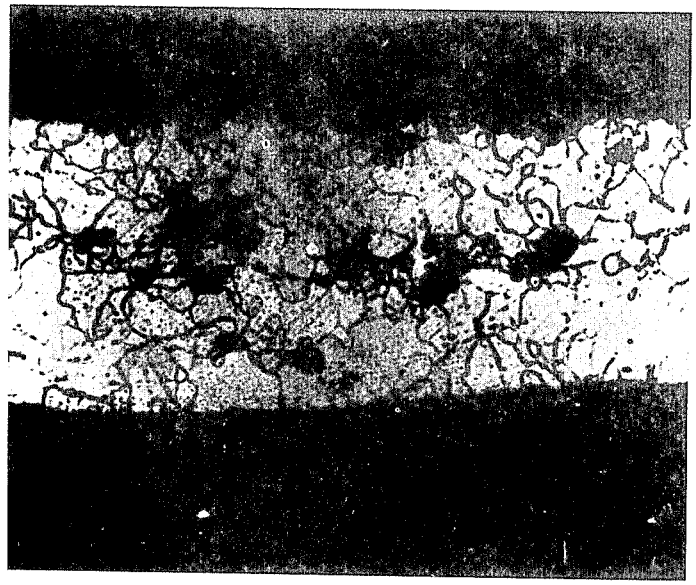

FIG. 4 is a view at a magnification of X300 of a seam in which two cold rolled steel sheets each about 76 $\mu$ thick are joined together. The rotating tool was applied to the surface of one of the sheets with a pressure of about 10 lbs. In the cohesive dry joint formed, the actual line of the joint cannot be followed along its whole length, crystal grain growth having occurred across the interface. The grain structure of the metal is equi-axial, having changed from the normal "flattened" (directional) grain structure of cold rolled steel sheet, but no indications of actual melting of the metal can be seen.

Figure 5:
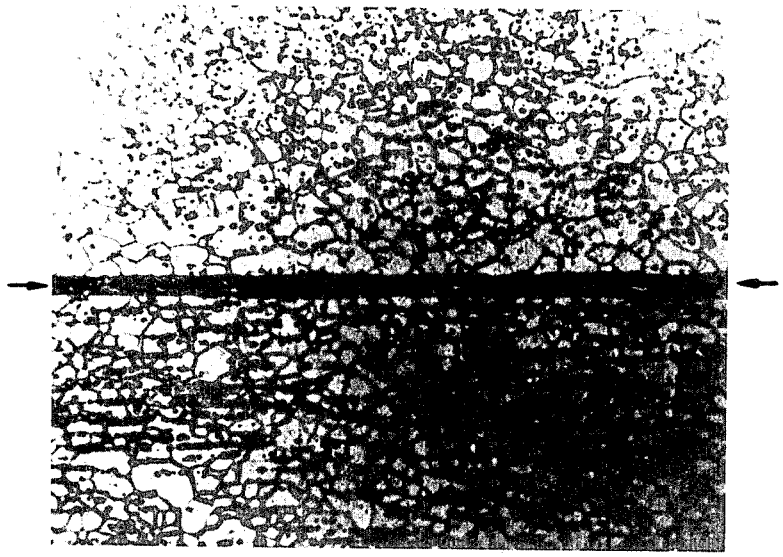

FIG. 5 is a view at a magnification of X560 of a tin-to-tin dry joint between two sheets of tin plate, each about 238 $\mu$ thick. The tin of one sheet is cohesively joined to the tin of the other sheet and no interface between the tin layers is visible.

Figure 6:
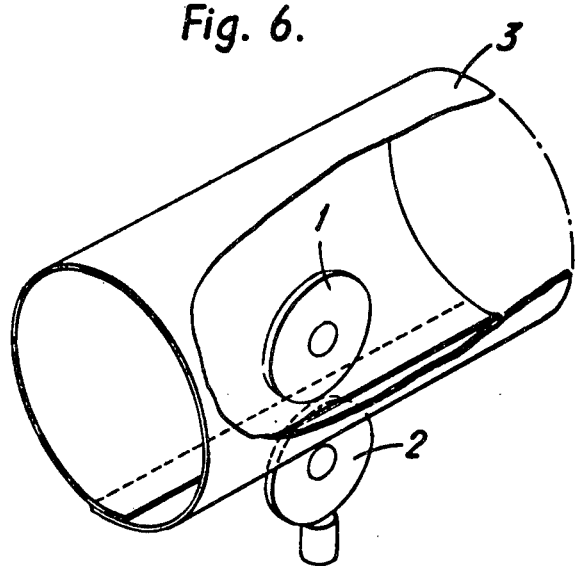
FIGS. 6, 7 and 8 show respectively first, second and third embodiments of apparatus in partly cut-away views.

In FIG. 6 a sheet 3 of metal has been bent so that its parallel edges overlap and it forms a broken cylinder. These edges are to be bonded together to form a tube. A driven friction wheel 1 is provided, on a type of mounting known per se and not shown, to work within the cylinder. It rotates at high speed, being much greater than the speed of travel of the sheet 3. It may rotate counter to the direction of that travel, or with it.

Opposing the wheel 1 across the lapped edges of the sheet is a backing wheel 2 acting to apply pressure to the edges moving at the same speed as the sheet 3. Additionally, the wheel 2 is mounted in communication with a source of ultrasonic energy so that auxiliary excitation is applied to the area where a seam is being formed due to the action of the friction wheel 1.

Figure 7:
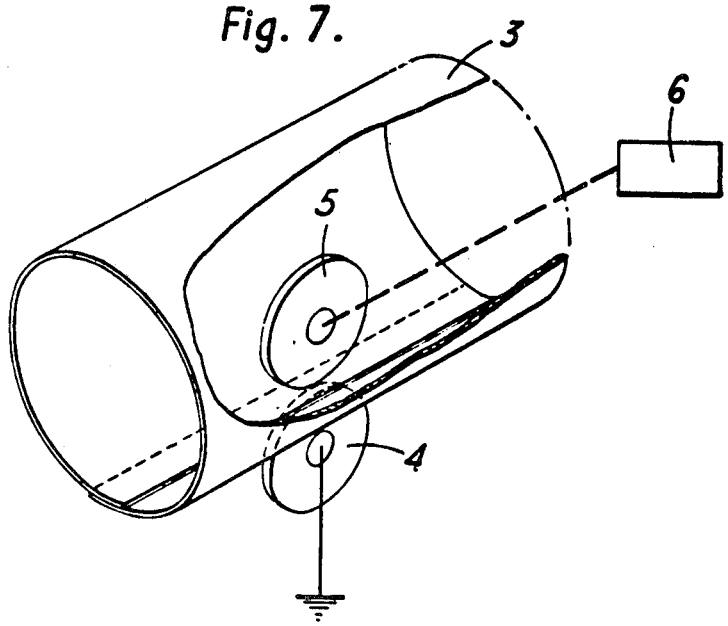

In FIG. 7 a similar sheet 3 of metal is acted on by a friction wheel 4 outside the cylinder, pressing radially inwardly towards it against a backing wheel 5 mounted within the broken cylinder. Auxiliary excitation may be applied by making one of these wheels an electrode of a high-frequency electrical generator 6, while the other wheel is earthed.

The provision in these apparatuses of means for auxiliary excitation either allows the bonding of materials on which a given frictional tool could not exert enough energy, or allows that tool to be run at a lower energy consumption (possibly more economical overall) or to obtain better results than had auxiliary excitation not been used. Nevertheless the provision of means for auxiliary excitation is not essential in these apparatuses.

The backing wheel or roller 2 or 5 may be replaced by another backing member — for example a static sheet or rod or a travelling band.

Figure 8:
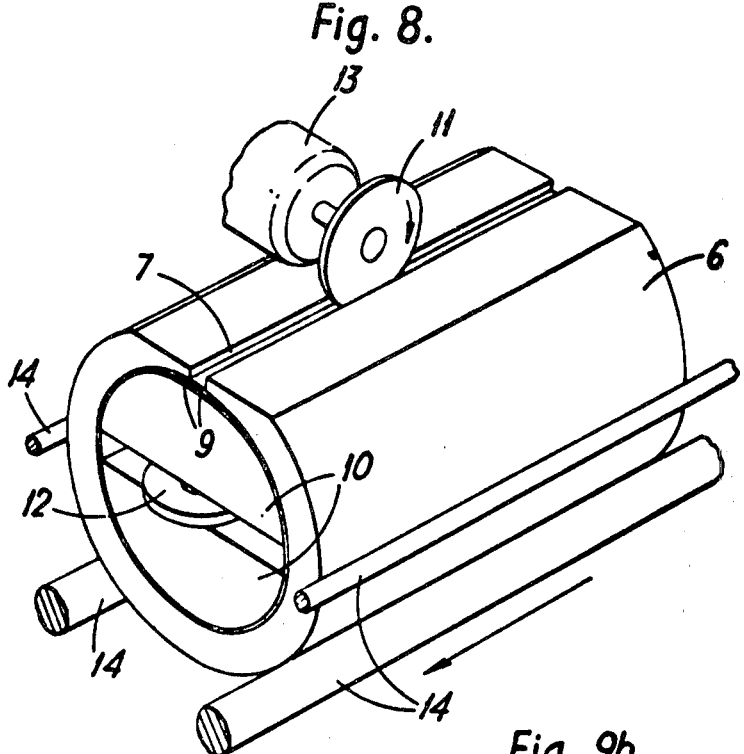

In FIG. 8 is shown a third form of apparatus. A jig consists of a gapped sleeve 6 of which the gap is an axial slit 7. Into this is placed a sheet 8 rolled with overlapping edges 9 around a two-part mandrel 10, which is then expanded by means of a double-threaded screw 12 to hold the sheet tightly between itself and the sleeve, with the overlapping edges 9 underlying the slit 7. A friction wheel 11 of hardened steel is placed so that it projects into the slit and can bear with some pressure on the edges 9 through it. A motor 13 drives the wheel in rotation so that where it bears on the edges its direction of motion is parallel to, and in the same direction as, the motion of the jigged assembly past the wheel. This motion is executed in a carriage mounted on guide rails 14.

Figure 9A:
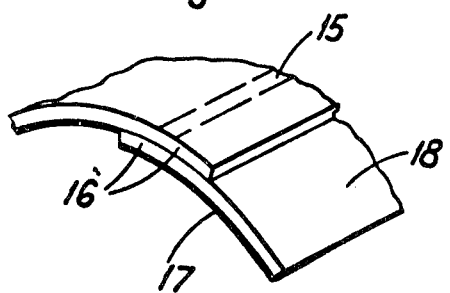
FIG. 9a, 9b and 9c show, respectively, first, second and third specific modes of forming a seam within the invention.

FIG. 9a., b. and c. show portions of cans to illustrate some of the types of seams that can be made by processes of the invention.

FIG. 9a shows the formation of a seam along the line 15 between lapped edges of tinplate 16, the plate being lacquered on the surface 17 which is the inside of the can except in the area of the seam and being printed on the can's outer surface 18.

Figure 9B:

FIG. 9b shows a seam 19 formed by seaming the overlapping seam edges as close as possible to the edge of the outer overlap thus causing it to be welded flush with the can body.

Figure 9C:
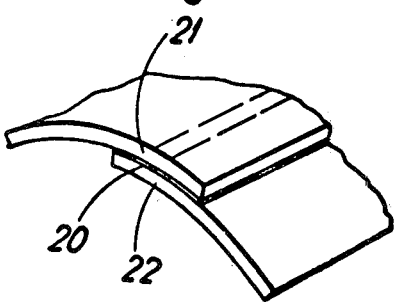

FIG. 9c shows a lapped joint formed by the use of a plastics layer 20 between the metal edge portions 21, 22, the frictional tool being applied to the surface of the edge 21 being exposed to the outside of the can.

The frictional tool usually works through the thickness of at least one layer of material e.g. being applied to the surface of a sheet opposite that which is to be bonded. It may work through an intervening layer of a material resistant to the adhesive or cohesive effect of the frictional treatment under the particular conditions used. The intervening layer does not adhere to or become part in any way of the can being produced. An intervening layer will usually be used only with thin or fragile materials, e.g. aluminum foil used as a can closure, to protect them from abrasion by the frictional tool.

Specific examples of process within the invention will now be given:

EXAMPLE 1

The forming and side seaming of a tinplate can from tinplate of 230 to 240 microns with a protective inside lacquer A tinplate blank is formed around the mandrel of the apparatus of FIG. 8 which is made of an insulating material, with its side edges overlapping for 5 mm. The mandrel is first inserted into the outer tubular sleeve and then expanded pressing the overlapping can edges into contact.

The rotary wheel is moved to the exact point on the overlap at which the seam is to be made.

In the present example the wheel diameter is 4.50 cms and its width 2 mms. It is made of treated and hardened steel and has a very smooth surface with excellent wear properties. The motor is ½ H.P. 600 watts, 240 volts, and the rotary speed of the wheel is controlled through a Variac transformer.

The wheel is set in motion before contacting the work and input voltage set at 45% on the transformer dial, rotary tool speed being in the region of 10,000 to 15,000 rpm. The carriage on which the sleeve is mounted is now set into motion and moves into contact and past the friction wheel at a speed of 25 cms seconds. Pressure of the wheel in the weld or contact area is approximately 5 Kgs.

The strength of the bond achieved by this method exceeds 200 lbs. inch as measured in shear testing equipment. If required, either a wider or a narrower seam can be made, or a double seam, for example one treated from outside the can and the other from the inside. If the bond is made at the outer edge of the overlap area it is possible to partly bond the projecting edge into the can body making an almost invisible seam.

EXAMPLE 2

Tin can side seam formed using solder

The whole set-up is similar to that of Example 1, (FIG. 8) but a very thin ribbon of solder is placed between the tinplate surfaces in the area of the overlap joint. Voltage input is reduced to 40% and pressure to 3 Kgs at contact point, speed of travel of the tubular can mount past the friction wheel is increased to 30 cms sec. Bond strengths again exceed 200 lb. inch and the bond is a particularly strong one.

EXAMPLE 3

The seaming of a tinplate can with a film of nylon 6.30 microns thick acting as an adhesive in the seam area The set-up is as in Example 1, with the only difference that a strip of nylon film is placed between the tinplate surfaces in the overlap seam zone, and that a wider wheel (4 mms) of identical material is used with a power input of 60% on the Variac transformer. Pressure of the seaming head on the work is increased to 7 Kgs at contact point. The seam obtained is due to the adhesion of the nylon films to the upper and lower surfaces of the tinplate, and bonds obtained are in the order of 80 lbs (40 Kgs) for 2 mm of seam width.

EXAMPLE 4

The seaming of two aluminium plates strip coated with Nylon 11 in the joint area, to each other Two decorated and protectively coated aluminium sheets 25/100 mm thick are taped to a backing surface of hard rubber with their edges overlapping in an area where one of them has received a strip of coating of "Nylon 11", the overlap being 5 mms wide. To prevent removal of the decorative coat by the friction wheel an intervening layer of "Teflon" (Polytetrafluoroethylene (E. I. Dupont de Nemours) is taped over the overlap joint area. The assembly (with a wooden block serving as a rigid backing is attached to a rail system so that it can be moved past the friction wheel which is 4 mms wide and has a diameter of 7.5 cms. Voltage input to the rotary motor is 60% and pressure applied at contact point of the wheel and the working surface is 3 Kgs. Speed of traverse of the assembly in relation to the friction head is 20 cms second. The resultant bond is a very strong one and a one inch strip remains unbroken at loads of 200 lbs. Applications are in the canning and packaging industries.

EXAMPLE 5

The welding of aluminium foil 18 microns thick to a round tinplate food container, the aluminium foil acting as a cover A round tin food container made of 1.5 mm thick tinplate is filled with food and then covered with aluminium foil 20 microns thick which is folded around and below the rim of the tin container. A stationary friction wheel of "Vespel" polyimide resin filled with molybdenum disulphide (E. I. Dupont de Nemours) is rotated at 25,000 to 30,000 rpm (80% voltage input) and the rim of the container is caused to engage the wheel on the side covered by the aluminium foil. The container is slowly turned until the whole of the rim has had the aluminum foil bonded to it. The strength of the bond is superior to the strength of the foil.

EXAMPLE 6

Side seaming of a can from chrome-chrome oxide (TFS-Ct) coated steel

Figure 1:
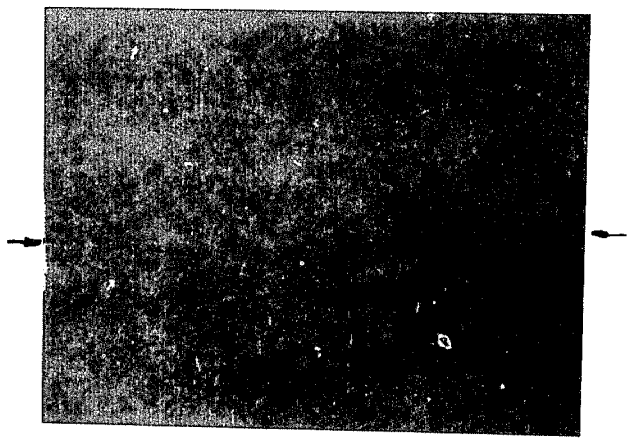
FIGS. 1 to 5 are reproduced from photomicrographs of bonded metal sheet which has been cut across the line of the seam.
Figure 2:
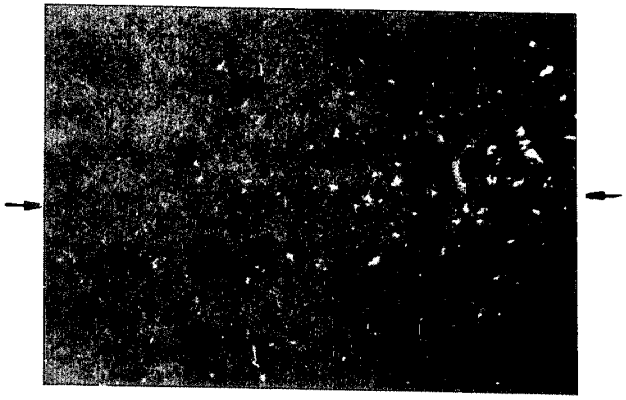
Figure 3:

The apparatus is essentially that of Example 1, the edges of the can blank of chrome-chrome oxide coated steel 150 microns thick being formed into a can with an overlap of 2 mms. The friction wheel of hardened steel, driven at a speed of 35,000 rpm contacts the seam under a load of 8 lbs (4 Kgs), the speed of passage of the can body beneath the friction head being 5 inches second. The resultant weld is similar to that illustrated in FIGS. 1 to 3. If the chrome chrome-oxide coating is first removed and the surfaces are cleaned a cohesive steel to steel weld of the type illustrated in FIG. 4 can be formed.

I claim:

1. A seamed article formed from metal sheet material and having at least one seam disposed along an interface between intimately contacting facing surfaces of juxtaposed portions of metal sheet each having an original grain structure, the seam joining the portions of metal sheet at the interface being a metallurgically homogeneous continuous line weld between the metal portions produced by energy supplied by dynamic rubbing friction applied by an external and independent tool in contact with a surface of at least one of the juxtaposed portions of metal sheet opposite to and adjacent the facing surfaces of the interface thereof while the facing surfaces of the metal portions at the interface are substantially stationary relative to one another, the line weld between the portions having:
   i. substantially uniform metallurgical grain characteristics at all points along the weld;
   ii. reorientation of the crystallization of the metal of the facing surfaces of the portions at the interface;
   iii. an absence at the interface of macroscopic disorientation of the metal grain structure of the type which would be caused by the melting of portions of the metal at the interface; and
   iv. through the thickness of the portions of the metal sheet extending from the line weld, the substantial preservation of the original metal grain structure of the portions of metal extending from the interface of the portions.

2. A seamed article according to claim 1 wherein the portions of metal sheet seamed are tin-plated steel and the line-weld is steel-to-steel.

3. A seamed article according to claim 1 wherein the portions of metal sheet seamed are tin-plated steel and the line-weld is tin-to-tin.

4. A seamed article according to claim 1 wherein the portions of metal sheet seamed are tin-free steel coated with one of chrome and chrome oxide, the one of chrome and chrome oxide coating not having been removed prior to the seaming.

5. A seamed article according to claim 1 wherein the portions of metal sheet seamed are aluminum portions.

6. A seamed article according to claim 1 wherein the seam is a side seam of a tubular container.

7. A seamed article formed from cold rolled metal sheet material having a flattened grain structure at a surface and an original grain structure extending through the thickness thereof, the container having at least one seam disposed along an interface between intimately contacting facing surfaces of juxtaposed portions of the metal sheet material, the seam joining the portions of metal sheet at the interface being a metallurgically homogeneous continuous line weld between the metal portions produced by energy supplied by dynamic rubbing friction applied by an external and independent tool in contact with a surface of at least one of the juxtaposed portions of metal sheet opposite to and adjacent the facing surfaces of the interface thereof while the facing surfaces of the metal portions at the interface are substantially stationary relative to one another, the line weld between the portions having:
   i. substantially uniform metallurgical grain characteristics at all points along the weld;
   ii. metallurgical grain growth across the interface of the juxtaposed portions of metal sheet;
   iii. reorientation of the crystallization of the grain structure at the interface, including the formation of an equi-axial grain structure at the interface between the juxtaposed portions;
   iv. an absence at the interface of macroscopic disorientation of the metal grain structure of the type which would be caused by the melting of portions of the metal at the interface; and
   v. through the thickness of the portions of the metal sheet extending from the line weld, the substantial preservation of the original metal grain structure of the portions of metal extending from the interface of the portions.

8. A seamed article formed from metal sheet material and having at least one seam disposed along an interface between intimately contacting facing surfaces of juxtaposed portions of metal sheet each having an original grain structure, the seam joining the portions of metal sheet at the interface being a metallurgically homogeneous continuous line weld between the metal portions produced by energy supplied by dynamic rubbing friction applied by an external and independent tool in contact with a surface of at least one of the juxtaposed portions of metal sheet opposite to and adjacent the facing surfaces of the interface thereof while the facing surfaces of the metal portions at the interface are substantially stationary relative to one another, the line weld between the portions having:
   i. substantially uniform metallurgical grain characteristics at all points along the weld;
   ii. the conservation of the original grain structure of the metal at the facing surfaces of the portions at the interface;
   iii. an absence at the interface of macroscopic disorientation of the metal grain structure of the type which would be caused by the melting of portions of the metal at the interface; and
   iv. through the thickness of the portions of the metal sheet extending from the line weld, the substantial preservation of the original metal grain structure of the portions of metal extending from the interface of the portions.

* * * * *

UNITED STATES PATENT AND TRADEMARK OFFICE
CERTIFICATE OF CORRECTION

PATENT NO. : 3,949,896
DATED : April 13, 1976
INVENTOR(S) : Penelope Jane Vesey Luc It is certified that error appears in the above-identified patent and that said Letters Patent are hereby corrected as shown below:

Col. 3, line 45, "excitstion" should be --excitation--;

Col. 3, line 49, "excistion" should be --excitation--;

Col. 3, line 66 "ultransonic" should be --ultrasonic--;

Signed and Sealed this

Twenty-fourth Day of August 1976

[SEAL]

Attest:

RUTH C. MASON
Attesting Officer

C. MARSHALL DANN
Commissioner of Patents and Trademarks